(12) United States Patent
Portman et al.

(10) Patent No.: US 8,693,998 B2
(45) Date of Patent: Apr. 8, 2014

(54) SYSTEM AND METHOD FOR MANAGING A CUSTOMER SERVICE SESSION

(75) Inventors: Leon Portman, Rishon Lezion (IL); Ilan Yosef, Pardessiya (IL); Zvika Moretzky, Tel-Aviv (IL); Assaf Frenkel, Ramat HaSharon (IL)

(73) Assignee: Nice-Systems Ltd., Ra'anana (IL)

( * ) Notice: Subject to any disclaimer, the term of this patent is extended or adjusted under 35 U.S.C. 154(b) by 285 days.

(21) Appl. No.: 13/013,866

(22) Filed: Jan. 26, 2011

(65) Prior Publication Data

US 2012/0190333 A1  Jul. 26, 2012

(51) Int. Cl.
*H04W 4/00* (2009.01)
(52) U.S. Cl.
USPC ..... 455/422.1; 455/411; 455/566; 455/456.1; 455/456.2; 455/456.3
(58) Field of Classification Search
CPC ............... H04W 64/00; H04W 4/02; G06Q 10/063114; H04B 1/3888; H04L 5/0035
USPC ........ 455/411, 566, 450, 456.1, 456.2, 456.3, 455/457, 418
See application file for complete search history.

(56) References Cited

U.S. PATENT DOCUMENTS

| 7,606,909 B1 * | 10/2009 | Ely et al. ........................ 709/227 |
| 2006/0229054 A1 * | 10/2006 | Erola et al. ..................... 455/403 |
| 2010/0197238 A1 * | 8/2010 | Pathuri et al. ............... 455/67.11 |
| 2011/0171939 A1 * | 7/2011 | Deliwala et al. ........... 455/414.1 |

* cited by examiner

*Primary Examiner* — Allahyar Kasraian
*Assistant Examiner* — Sayed T Zewari
(74) *Attorney, Agent, or Firm* — Pearl Cohen Zedek Latzer Baratz LLP

(57) ABSTRACT

Embodiments of the invention are directed to a method of providing a service to a user of a mobile communication device. A selection a service may be received. An optimal option for providing a selected service may be determined and displayed on a mobile communication device. A session including a voice communication channel and a data communication channel may be established and used to provide a selected service.

20 Claims, 9 Drawing Sheets

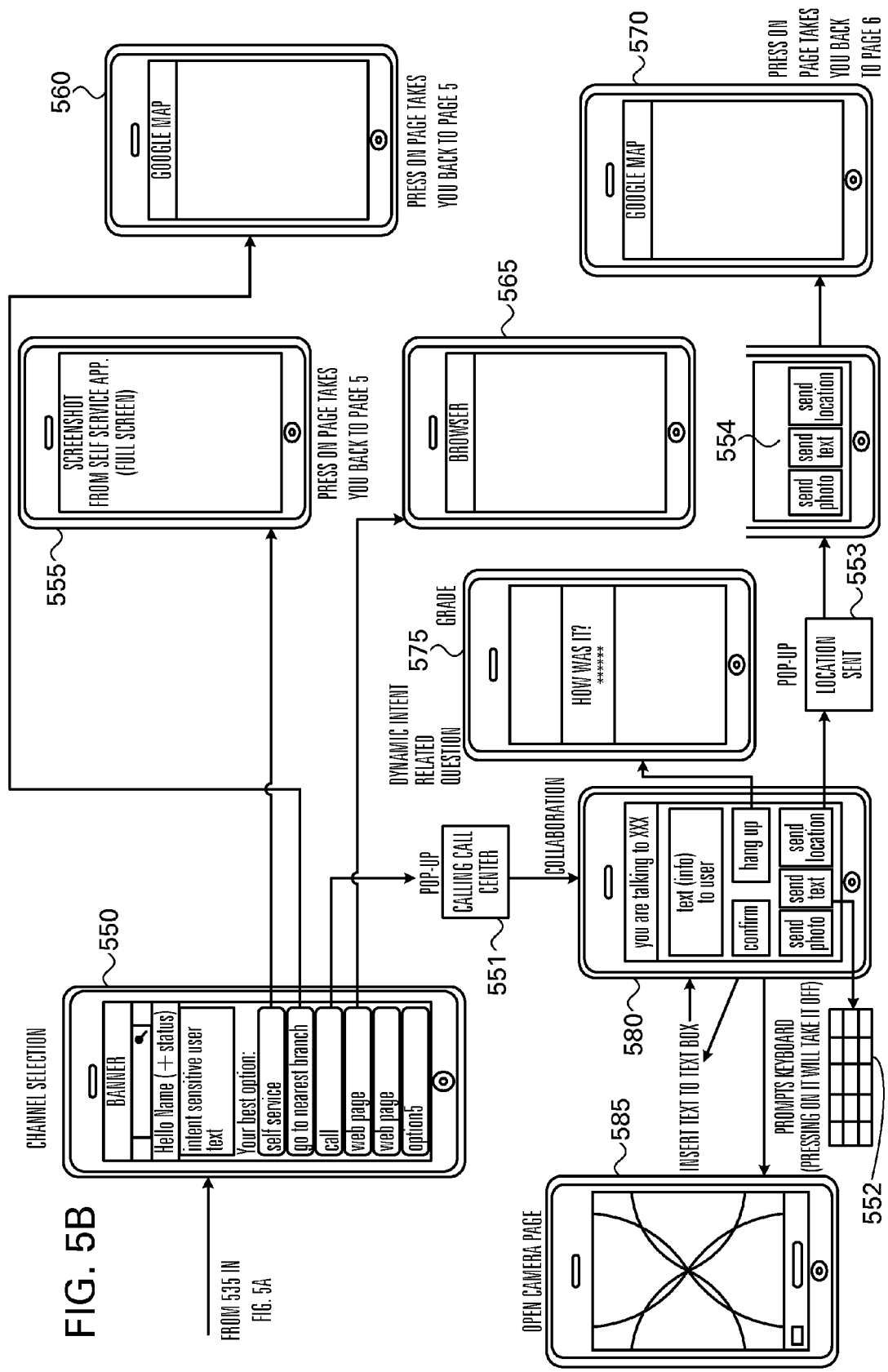

SYSTEM AND METHOD FOR MANAGING A CUSTOMER SERVICE SESSION

BACKGROUND OF THE INVENTION

Availability of sophisticated communication devices such as smartphones and tablet computers as well as vast deployment of mobile services and the Internet enable organizations and service providers to offer their customers a variety of ways of interaction over a multitude of communication channels. For example, to interact with a contact center or an organization, customers may use landline phones, mobile phones, Short Message Service (SMS), electronic mail (email), web chat or instant messaging. Accordingly, organizations today offer consumers various alternative communication channels and services. For example, a customer may interact with an organization by talking to an agent or representative, exchanging text (e.g., over email or SMS) or using web based services.

Modern communication channels may enable flexibility in providing services, time saving for customers, reduced a contact center's operational costs, increased efficiency and customer satisfaction as well as other benefits.

However, in some cases, the availability of a large number of communication channels may be overwhelming and even counter productive. In some cases, usage of advanced devices and technologies may be deterring and/or difficult for some customers, which in turn may result in customer confusion, frustration and dissatisfaction. For example, a customer may find it challenging to keep track of on-going interactions that may be over a number of communication channels. In other cases, a customer may fail to navigate through an automated system, e.g., an Interactive Voice Response (IVR) or an online web service and may even fail (or lose the will) to reach a customer service representative (CSR). In some cases, although a suitable communication channel may be in place, a customer may not be advised, in real-time, of the communication channels that may be best suited for his or her needs. Another problem related to using multiple communication channels to interact with a contact center may be providing or receiving redundant information, e.g., information is provided or received twice or more over two or more different communication channels.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 5B, shows exemplary screenshots and operations according to embodiments of the present invention;

Figure 1:
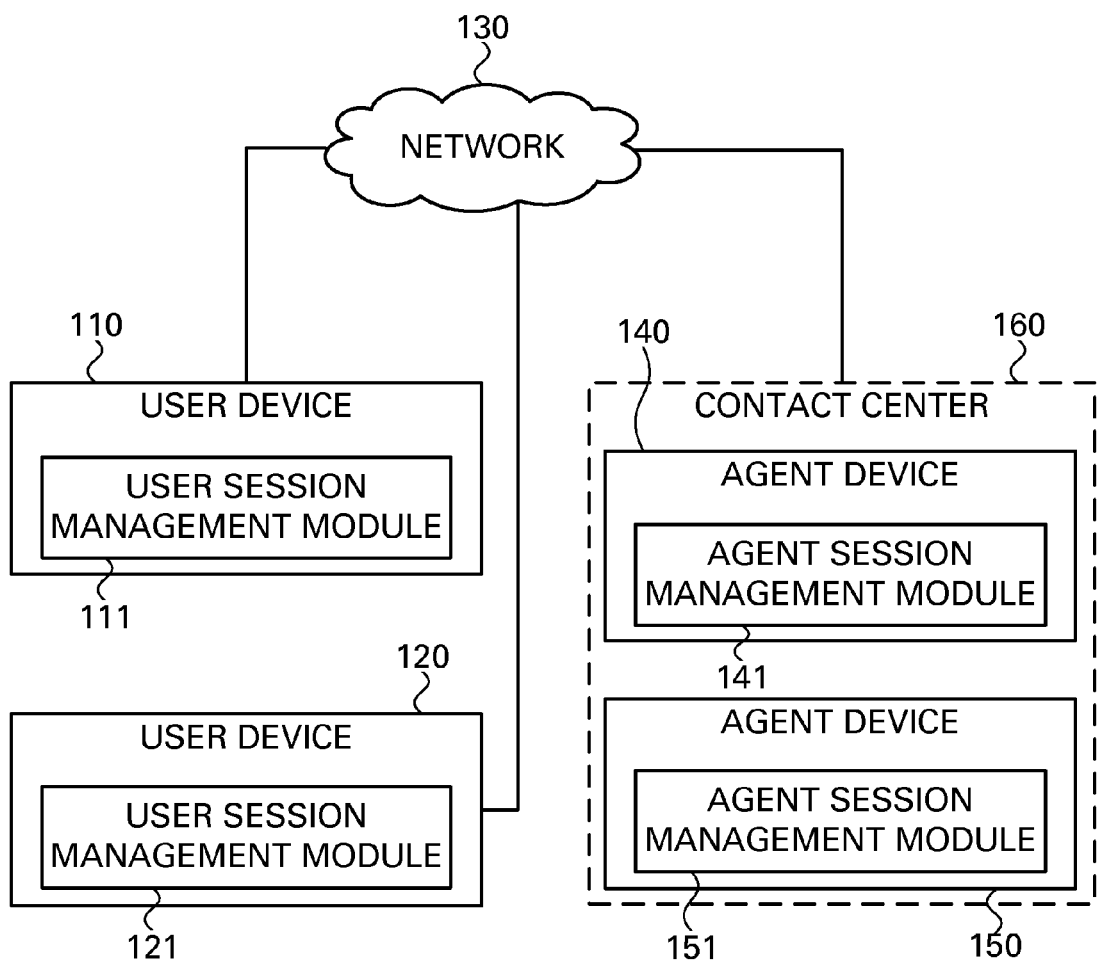
FIG. 1 shows an exemplary setup according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Reference is made to FIG. 1 that shows an exemplary setup according to embodiments of the invention. As shown, a setup according to embodiments of the invention may include user devices 110 and 120. As further shown, user devices 110 and 120 may include, or be otherwise associated with, user sessions management modules 111 and 121 respectively. The setup may further include a network 130 and a contact center 160. As shown, agent devices 140 and 150 may be located in contact center 160. As further shown, agent devices 140 and 150 may include, or be otherwise associated with, agent session management modules 141 and 151 respectively. For the sake of clarity and simplicity, only two agent devices 140 and 150 are shown in a contact center 160, however, embodiments of the invention are not limited in this respect. For example, more or less agent devices may be deployed in any applicable location or setup. In some embodiments, a single agent device may be used in an organization, or any number of agent devices may be deployed in an organization that provides services such as insurance, healthcare, travel or financial services. Accordingly, it will be understood that reference to contact center 160 and agent devices 140 and 150 is made for explanatory purposes rather than as a limitation. Agent devices 140 and 150 may be, may include or may be part of any suitable computing device. For example, agent devices 140 and 150 may be a system including a computer and a telephone, a telephone including a computer. Accordingly, agent devices 140 and 150 may be capable and/or configured to perform any operation that may be performed by a telephone as well as any operation that may be performed by a computing device. For example, agent devices 140 and 150 may be may be capable of supporting a voice session (e.g., the same way a telephone does) and, possibly at same time, support a data channel (e.g., sending and receiving data as done by computers).

User devices 110 and 120 may be any applicable communication devices. For example, user devices 110 and 120 may be or may include mobile communication devices such as a mobile phone, a smartphone or a tablet computer. In some embodiments, user devices 110 and 120 may be or may include, for example, a personal, notebook, desktop, mobile or laptop computer, a Personal Digital Assistant (PDA) device, a network device, or any other suitable computing and/or communication device. In particular, user devices 110 and 120 may enable voice conversations, receiving and sending SMS, instant messaging and web browsing. User devices 110 and 120 devices may be equipped with powerful processing capacity, large memory, an operating system and applications offering user-friendly graphical user interface, high resolution screen, convenient input controls such as full keyboard or touch screen, and an ability to run general or specific purpose applications.

User session management modules 111 and 121 (also referred to as "module 111" and "module 121" herein) may be hardware modules or units, software modules, firmware modules or any combination thereof. In one embodiment, user session management modules 111 and 121 may be a software application configured to be executed by a controller installed on user devices 110 and/or 120.

Agent devices 140 and 150 may be any applicable device used by an agent or CSR. For example, agent devices 140 and 150 may be or may include a wired or wireless telephone, a personal or other computer, a PDA, a mobile communication device such as a mobile phone, a smartphone or a tablet computer or any combination of such devices. Agent session management modules 141 and 151 may be hardware modules or units, software modules, firmware modules or any combination thereof. In one embodiment, agent session management modules 141 and 151 may be a software application configured to be executed by a controller installed on agent devices 140 and/or 150.

As shown, user devices 110 and 120 may be connected to network 130. As further shown, contact center 160 may be connected to network 130. It will be understood that although not shown, agent devices 140 and 150 may be connected to network 130. For example, agent devices 140 and 150 may be connected to an internal network in contact center 160 and the internal network, possibly via various network devices such as routers, firewalls and the like may be connected to network 130. Accordingly, it will be understood that agent devices 140 and 150 may communicate with user devices 110 and 120 to exchange voice, data or other forms of digital information with user devices 110 and 120.

Network 130 may be, may comprise or may be part of any suitable communication network. For example, network 130 may be a private or public IP network, or the internet, or a combination thereof. Additionally or alternatively, network 130 may be, comprise or be part of a global system for mobile communications (GSM) network. For example, network 130 may include or comprise an IP network such as the internet, a GSM related network and any equipment for bridging or otherwise connecting such networks as known in the art. In addition, network 130 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 130 are implied but not shown, e.g., access points, base stations, communication satellites, GPS satellites, routers, telephone switches, etc. It will be recognized that embodiments of the invention are not limited by the nature of network 130.

For the sake of clarity and simplicity, various components that may be included in the setup shown in FIG. 1 are omitted. For example, servers, routers or other devices that may be attached to network 130 are not shown. For example, servers operated by an internet service provider (ISP) that may provide internet access and/or other services to users operating user devices 110 and 120 are not shown. Similarly, servers and/or other devices that may be deployed in contact center 160 are not shown. For example a customer relationship management (CRM) server and/or database, a private branch exchange (PBX) and/or other devices or systems that may be included in contact center 160 are omitted for clarity.

The term "session" as used herein should be broadly and expansively construed to include any configuration, setup, or other aspects of hardware and/or software that may enable entities to exchange content or otherwise interact. For example, a session may enable two human entities to exchange voice and/or data, e.g., talk and exchange multimedia or other content. A session may enable an agent, customer or any party to exchange voice and/or content with a computer application or enable two or more computer applications to exchange information and/or content. For example, a session may include a voice channel or connection and one or more transmission control protocol (TCP) connections between two computers.

A session may include one or more communication channels, e.g., a chat channel, an electronic mail (email) channel, an instant messaging channel and a short message service (SMS) channel. Other methods, systems or devices for communicating information, e.g., facsimile (fax) or pager may be included in a session. The phrase "communication channel" as used herein should be broadly and expansively construed to include any form of communicating or exchanging information. For example, a data communication channel may be or may include communicating any type of data from a source to a destination. For example, an email channel may comprise communicating email messages from a source to a destination, a chat or web chat channel may indicate or include communicating text and other data using a chat application and an SMS communication channel may be a setup enabling parties to send or exchange text messages. The type and/or number of communication channels included in a session may be dynamic. For example, a network connection for communicating data may be dynamically added to, or removed from, a session that already includes a voice channel. In another example, a TCP connection, a user datagram protocol (UDP) flow or a voice channel may be removed from a session. Information and/or content exchanged over a session may be of various types, nature or form. For example, data, information and/or content communicated over a session may be a file, a video clip, an image, a link, voice, or any other form and/or type of information and/or content. A session may involve many computing or other devices, for example a session may involve a first computer, a network device, a private branch exchange (PBX) and a second computer.

A session may involve various entities such as, but not limited to, computing devices, switching devices, routing devices, computer applications and humans. For example, a session may involve a first human, e.g. a customer, possibly operating a mobile phone, one or more computing devices that may perform various administrative or other functions, one or more switching devices that may perform switching of information between various communication facilities, and a second human, e.g. an agent, operating a second computer and/or a telephone in order to participate in the session. Alternative configurations may further affect various aspects associated with a session, such as, operational aspects, control aspects etc. For example, an entity may obtain configuration information and may further use such information in order to apply an appropriate configuration such as to enable it to exchange content over a session or be otherwise associated with a session. Accordingly, a first entity associated with a session with which a second entity is also associated may enable a third entity to participate in the session, for example, by providing required configuration information (e.g. port numbers) and/or by routing packets.

Figure 2:
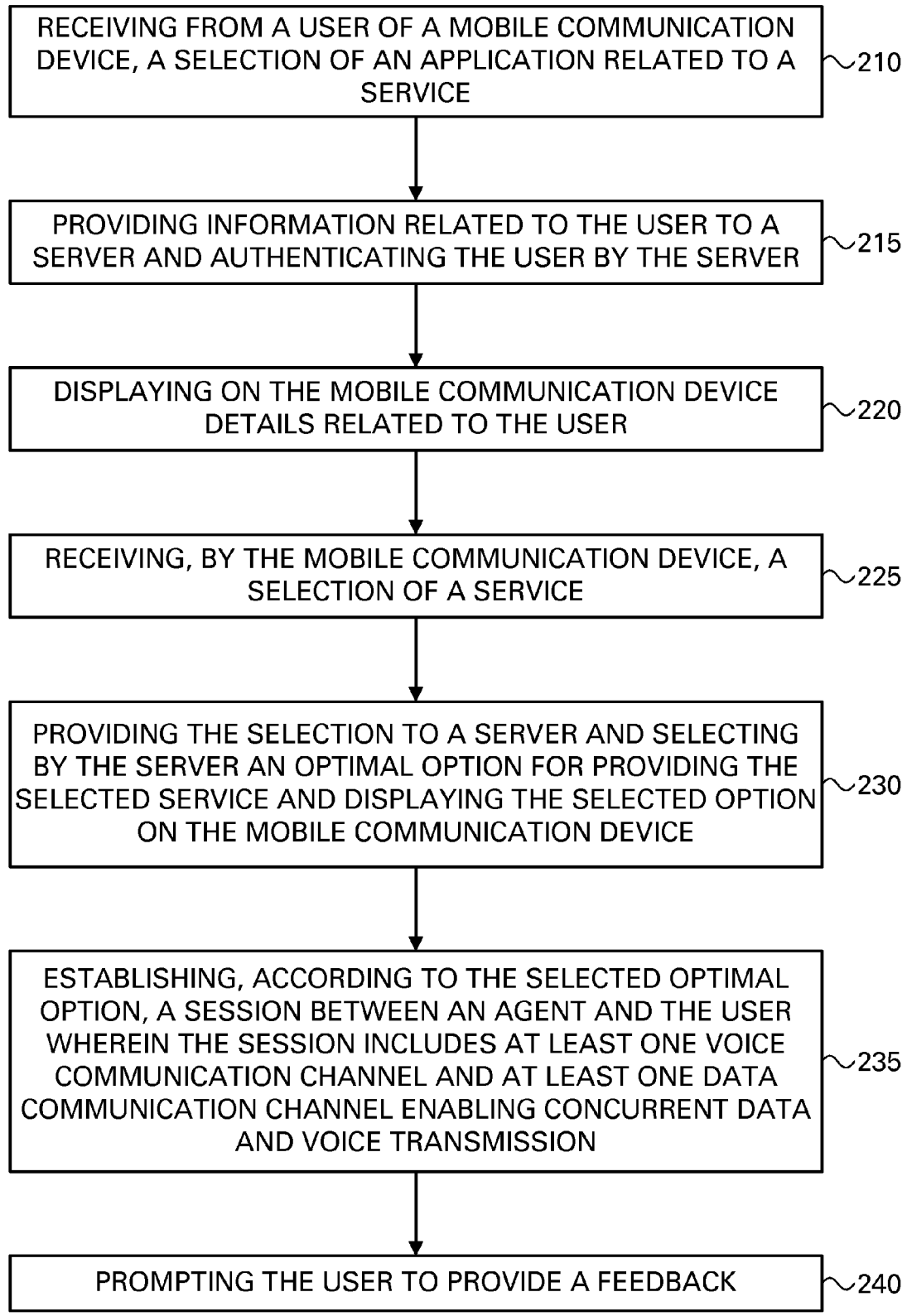
FIG. 2 is a flowchart diagram according to some embodiments of the present invention.

Reference is made to FIG. 2, which is an exemplary flowchart describing a method according to some embodiments of the present invention. It will be understood that some of the operations or steps shown in FIG. 2 may be omitted in some embodiments, or they may be repeated or performed in a different order from the order shown in FIG. 2. The method described with reference to FIG. 2 includes communicating information between user devices such as user devices 110 and 120, agent devices 140 and 150 and various servers connected to network 130 and in contact center 160. According to embodiments of the invention, user session modules 111 and 121 and agent session management modules 141 and 151 may establish connections with each other as well as with any server, device, system or entity connected to network 130. For example, user session modules 111 may communicate with a server in contact center 160 as well as with user session modules 121 and/or agent session management modules 141. For example, TCP connections may be established by any one of user session modules 111 and 121 and agent session management modules 141 and 151 with any entity to enable them to communicate with the entity. Accordingly, user session modules 111 and 121 and agent session management modules 141 and 151 may communicate and receive information from any computing device or system connected to network 130.

Figure 3:
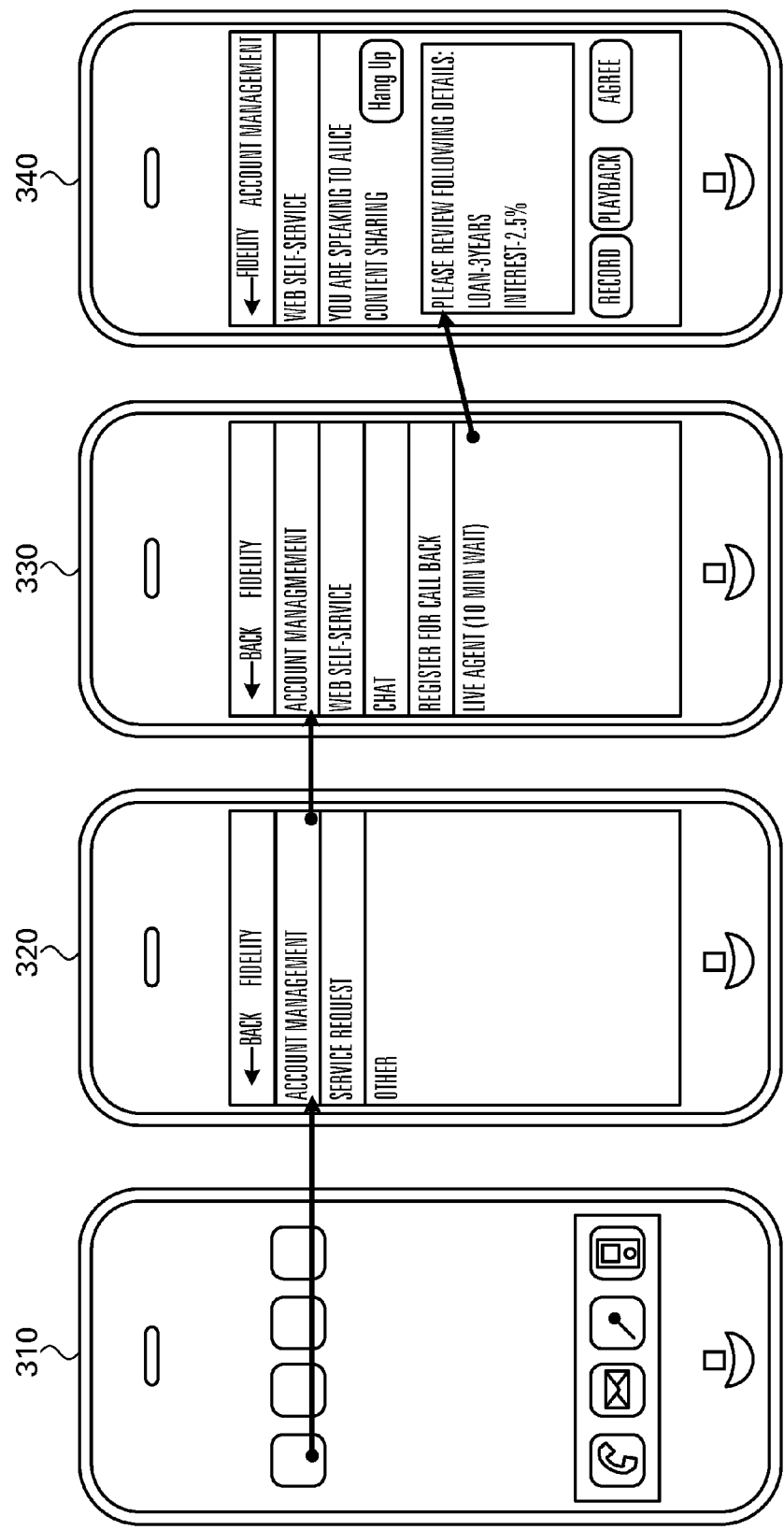
FIG. 3 that shows exemplary screenshots according to embodiments of the invention.

As shown by box 210, the method may include receiving from a user of a mobile communication device a selection of an application related to a service. For example, user session management module 111 may display a number of icons on a display screen of a smartphone that may be user device 110 and each of the icons may be associated with one or more applications. Accordingly, by clicking an icon a user may select an application related to a service. Reference is additionally made to FIG. 3 that shows exemplary screenshots according to embodiments of the invention. As shown by 310, a number of icons related to a number of applications may be displayed on a screen of a smartphone. Accordingly, by clicking an icon, a user may select an application as shown by block 210.

As shown by box 215, the method may include providing information related to the user to a server and authenticating the user by the server. In some embodiments, rather, instead or in addition to authenticating a user, the user may be identified. For example, parameters (e.g., a phone number or a user identification parameter) stored in a memory of a device operated by the user may be used to identify the user and a session may be established either without authenticating the user, or only authenticating the user when sensitive, privileged or private information needs to be communicated, accessed or manipulated. For example, module 111 on user device 110 may store or obtain any relevant information pertaining to a user of device 110, e.g., a user name, a login name etc. Additionally or alternatively, an application (e.g., module 111) on the mobile device may prompt a user for details or parameters such as user name and password and may communicate such information to a server. For example, a server (not shown) in contact center 160 may be provided with login or other information and may authenticate the user. For example, the server may interact with module 121 on user device 120 in order to authenticate the user or operator of user device 120. Module 121 may prompt a user to provide a password or other information that may be used in an authentication of a user. Authentication may be performed in a variety of ways. For example, upon connecting to the internet, an ISP may authenticate the user. Module 111 may obtain any information or parameter related to an authentication of a user with an ISP and may communicated any authentication related information to a server or other entity in contact center 160. Accordingly, a user may need not authenticate himself more than once each time he or she logs on to a network. Other methods, e.g., using stored or manually provided credentials, biometric parameters such as voice or fingerprint may be used in an authentication as shown by block 215.

At any point in time, any relevant information may be communicated by user session management module 111 or 121 to any destination. For example, user session management module 111 may interact with a global positioning system (GPS) application on user device 110, obtain any positioning information and communicate such information to a server in contact center 160, to one of agent devices 140 or 150 or to any preconfigured destination. Service related information may be obtained, determined, displayed and/or communicated by user session management module 111. Information or parameters related to a location of the user may be communicated over the. For example, user session management module 111 may communicate a parameter indication a location of user device 110 to a server in contact center 160 and the server may communicate to user session management module 111 information related to services or other aspects relevant to the location of user device 110.

For example, based on a location of user device 110 and information related to a location of service points, e.g., a bank, an automated teller machine (ATM), a garage etc. user session management module 111 may determine the nearest service point of a specific service and display to a user and/or communicate to a server in contact center 160 or elsewhere relevant information. Alternatively or additionally, a server in contact center 160 provided with location information may determine any relevant information, e.g., the nearest service point, relevant events (e.g., a show or a specific local offering), may communicate such relevant information to user session management module 111 that may in turn present such information to a user.

As shown by box 220, the method may include displaying on the mobile communication device details related to the user. For example, user session management module 111 may display any information received from any source on a display of user device 110. For example, any information retrieved from a CRM or other system, e.g., in contact center 160 may be provided to user session management module 111 that may selectively or otherwise, e.g., based on locally stored user configuration parameters, display such information. For example, a personalized welcome message that may include the user's name or other personal details may be displayed on a screen of a mobile communication device. Other personal information that may be displayed may be information related to the user's account such as billing information, account status etc. Such personal information may be retrieved from a CRM system, an enterprise repository, other databases or any applicable source.

As shown by box 225, the method may include receiving, by the mobile communication device, a selection of a service. For example, as shown by 320, upon clicking an icon related to an application as shown by 310, a list of services may be presented. The list of services displayed may be related to the application selected. For example, selecting an application as shown by block 210 (e.g., by clicking one of the icons shown in 310) related to travel may cause a presentation of services such as "book ticket", "plan trip", "reserve hotel" and the like while selecting an application related to banking may cause user session management module 111 to display a list of services such as "View balance", "Manage account" etc. A process of receiving a selection of a service may include presenting one or more interactive screens to a user. For example, having selected an application related an account as described with reference to block 210, receiving a selection of a service may include displaying a first interactive screen that may list a number of options such as "Payment", "Billing", "Plan" etc. Selecting "Billing" may cause module 111 to display a second screen that lists options such as "Current and past bills", "Account spending limit", "Surcharge, Taxes, Fees", "Payment terms" and the like. Other interactive means may be used in order to determine a user's intent or a desired, specific service. For example, free format text may be provided by the user and one or more services matching the text may be displayed. Voice or speech recognition may be used to receive a selection verbally provided by a user, lists of bookmarked services, last requested services, "hot topics" and the like may all be used in the process of receiving a service selection. Banners advertising or promoting services may also be displayed to prompt a user to select a service. Generally, user session management module 111 may be in communication with a server in contact center 160 or with any server, e.g., on the internet. Accordingly, any information available on the internet or in contact center 160 may be provided to user session management module 111 and used in the process of determining an intent or a service required or desired. Generally, at an end of receiving a service selection as shown by block 225 user session management module 111 may obtain a user's intent or a service selection that may be used as described herein. In some embodiments, a service selection or intent may be automatically suggested. For example, based on past interactions, a service may be selected upon receiving a call or other communication from a customer. For example, upon receiving a call, a database entry or a user profile may be examined and it may be determined that the calling party is typically or frequently interested in a specific service, accordingly, such specific service may be suggested thus saving time, navigation through menus, or otherwise improving providing a service.

As shown by box 230, the method may include providing the selection to a server and selecting by the server an optimal option for providing the selected service and displaying the selected option on the mobile communication device. For example, a service selected by clicking one of the icons shown in 310, a selection of a service may be indicated and/or provided to module 111. User session management module 111 may send the selection to a server in contact center 160 and the server may select an optimal option, way, method, communication channel or system for providing the selected service.

Any information, data or parameters may be used to select an optimal option and/or one or more communication channels for providing a service. For example, a parameter related to the communication device used by the user (e.g., type of device, display resolution, screen size, memory or processing capacity), a geographical location of the user, a date, a day in the week, a weather condition, an event (e.g., a birthday or holiday) or a time of day may all be used in a process of selecting an optimal option and/or one or more communication channels. For example, in order to enable a visual greeting card on a birthday, a communication channel enabling communicating images or multimedia may be selected.

A service selection or customer intent may be mapped to one or more communication channels that may be optimal based or according to any considerations, configuration or parameter. For example, user location, sales opportunities, user status or rating (e.g., gold, silver, bronze etc.), information in a user profile, load considerations (e.g., network load, queue or work load in a contact), user's preferences, e.g., service options or locations recorded as preferred by the user or a campaign (e.g., according to information retrieved from a campaign management system) may all be used by a server in order to select an optimal option and/or a communication channel for providing the selected service.

An optimal option for providing a service may relate to any aspect of providing the service. For example, whether the customer will be directed to a CSR (a manned channel), a web site, an IVR etc. Selecting an optimal option for providing a service may include selecting one or more communication channels. For example, selecting one or more voice channels (e.g., for talking to a CSR or interacting with an IVR), one or more data channels that may be or include, for example, SMS, email, web chat, instant messaging, file transfer protocol (FTP) for uploading or downloading files, hypertext transfer protocol (HTTP) based communication (e.g., interacting with a web site), a TCP or UDP connection etc.

A selected option or communication channel may be displayed on the mobile communication device. For example, as shown by 330 in FIG. 3, an option of a self service using a web site (shown as "Web Self-Service"), using chat (shown as "Chat") or talking to an agent (shown as "Live Agent (10 minutes wait)"). Any other applicable communication channels or options for providing a service may be selected and/or displayed. For example, a video call or session (e.g., a video call with an agent), leaving a number and have an agent call back, being contacted by email may all be selected and/or suggested to a user. In one embodiment, selecting an option and determining related parameters may be performed by a server in a contact center. For example, a server in contact center 160 may select a number of possible communication channels and/or a number of options for providing a service, may further prioritize selected or possible options and communicate relevant data to user session management module 111. User session management module 111 may examine any parameters stored on user device 110, for example, locally stored preferences or configuration parameters, and may further display a list of options and/or communication channels on a display of user device 110.

Various parameters related to a suggested option for providing a service or a suggested communication channel may be displayed, indicated or otherwise provided to a user. For example, as shown by 330 in FIG. 3, an estimated or otherwise determined wait time may be displayed. For example, based on work load in contact center 160, availability of agents or other considerations, a server in contact center 160 may estimate or determine a time a user may have to wait for an available agent and provide user management session module 111 with such estimation and module 111 may display such information as shown by 330.

As shown by box 235, the method may include establishing, according to the selected optimal option, a session between an agent and the user wherein the session includes at least one voice communication channel and at least one data communication channel enabling concurrent data and voice transmission. Providing the user with a list of communication channels may be based, at least in part, on an indication of a preferred communication channel received from the user. For example, a list of communication channels may be compiled based on a user selection, previous selections made by the user (e.g., as stored in a user profile). For example, by selecting an option of providing a service or a communication channel, e.g., by clicking on "Live Agent (10 minutes wait)" shown in 330, a communication channel may be established or other relevant actions may be performed. For example, by clicking "Live Agent (10 minutes wait)" shown by 330 in FIG. 3, a call (voice channel) to a contact center may be established as shown by 340. Any information relevant to the communication channel and/or the service may be displayed. For example and as shown by 340, the name of the agent, e.g., as shown by "You are speaking to Alice" in screenshot 340, account information or account related offerings or other promotional content, e.g., offering a term or interest rate as sown by "term: 3 year" and "interest 2.5%" in screenshot 340. In other embodiments, cases or scenarios, rather than connecting the user to an agent, selecting a service may establish a session between the user and an application, device or system. For example, by selecting "Web Self-service" shown in 330, rather than being connected to an agent, a web session between the user and a web site may have been established enabling the user to use self service in a web site. Accordingly, embodiments of the invention may enable a user to select a method, way or mode of receiving a service and/or a communication channel.

At any point during the flow described herein any advertisement or other promotional or marketing information may be presented to a user. For example, once an intent or desired service is determined, a context may be determined and a relevant advertisement (e.g., a banner) may be displayed. For example, if the user selected a service related to a bank account, an advertisement related to a credit card, loan or other related issues may be displayed. An advertisement presented may be based on a user profile, a location of the user, a service point near a location of the user etc. Any other information may be displayed. For example, posts from social networks, e.g., posts related to a selected service or other community based content may be displayed. A user may, e.g., upon selecting a dedicated icon, be directed to a social thread relevant to the selected service and communicate with other users on issues related to the service. As described herein, any data may be communicated over a session over any number of communications channels included in the session. For example, voice, images, files, and multimedia content may all be communicated over a session that includes a voice channel and a data channel.

As shown by box 240, the method may include prompting the user to provide a feedback. For example, upon completion of providing a service the user may be prompted to provide feedback that may be grading of the service provided. Prompting for feedback may be done by graphical means, e.g., thumb up and thumb down icons that may be pressed or it may be textual based, e.g., providing a text box in which the user may type free format text. Although in some embodiments a feedback may be obtained from a user over any session or communication channel, e.g., over a session established after the session over which the service was provided, in some embodiments prompting the user to provide a feedback may be performed prior to terminating the session over which the service is or was provided. Prompting the user for feedback may be based on information or parameters stored in a user profile, in a memory of the mobile communication device or any other data. For example, based on stored information, prompting for feedback may include asking the user to compare the current session with a previous one, e.g., displaying on a screen a previous feedback received from a user and asking the user to compare the quality of service provided in the current and past sessions.

As described herein, the number and/or type of communication channels included in, or associated with, a session may be dynamic. For example, a session may initially include a voice channel, however, during a conversation with a client, an agent may wish to present to the client an image of a product, a map needed to reach a service point or a video clip showing operational steps related to operating a product. In such case, a data channel may be added to the session thus enabling the agent to provide the customer with any form or type of data needed. When no longer required, a communication channel may be removed from, or be disassociated with, a session. For example, in order to save resources such as network bandwidth or computational resources, a communication channel may be removed from a session while the session is still active or established. For example, by observing a communication channel is idle for a predefined period of time, user session management module 111 or agent session management module 141 may remove the communication channel from the session, e.g., by terminating the communication channel.

Synchronization or management of communication of data over a session may be performed by a session management module such as modules 111, 121, 141 or 151. In some embodiments, session management module on an agent's device may interact with a session management module on an user's device in order to synchronize or otherwise manage communication of data and/or voice. For example, agent session management module 111 may synchronize, prioritize or otherwise manage communication of voice and data from agent device 140 to user device 110. For example, module 111 may limit or stop communication of data to user device 110 over a data communication channel based on events (e.g., Dual-tone multi-frequency signaling (DTMF) signals) communicated over, or related to a voice channel. For example, after commencing communication of a video clip to a user device, by pressing a predefined key sequence on a keypad, an agent may stop data communication (e.g., communication of the video clip) to a user device. For example, module 111 may capture key presses and may stop communication of data over a data communication channel associated with the session. In other embodiments of cases, module 111 may provide DTMF like audible signals to an agent indicating various aspects related to a data communication channel. For example, a completion or failure of a transmission of content over a data communication channel associated with a session may be indicated to the agent (and/or the user) over a voice channel associated with the session. Other operations, e.g., as described below with respect to operating a plurality of devices may be performed, as applicable, when a party to a session uses a single device.

Communicating over a session may include operating more than one device by a customer or by an agent. For example, in a session involving an agent and a customer, the customer may use a smartphone to communicate and display both voice and data, e.g., by talking on the smartphone and interacting with graphical information displayed on a display of the smartphone and the agent may use a phone and a computer. The agent may use the phone to talk with the customer and the computer to communicate data to the user. Accordingly, the session may involve three devices. Information communicated by devices associated with a session may be synchronized. Communicating information over a first communication channel associated with a session may be based on information communicated over a second communication channel associated with the session. For example, an alarm, status indication or data related to a data channel associated with a session may be communicated or provided over a voice communication channel associated with the session.

For example, an agent may use agent device 140 to talk to a customer who is using user device 110 and the agent may further use agent device 150 to communicate or otherwise handle data sent to, or received from, user device 110. In such case, agent session management module 141 may be in communication with agent session management module 151. Modules 141 and 151 may collaborate to synchronize or otherwise manage communication of information over the session. For example, a predefined sequence of keys pressed on agent device 140 may be captured by module 141, communicated to module 151 that may, in turn, send a predefined content to user device 110. For example, promotion material related to an ongoing campaign may be stored in a server in contact center 160. During a conversation with a customer, an agent may realize the promotion material may be of interest to the customer. The agent may press a predefined key sequence on a keypad of agent device 140, the sequence may be captured by module 141 which may send it to module 151 that may, upon receiving a predefined key sequence, send a predefined content to user device 110. In another case, module 151 may inform module 141 upon successfully sending of data to user device 110 or upon failure to send data to user device 110 and module 141 may provide an agent with an audible notification. Accordingly, an agent may know if or when data sent to a user has indeed reached the user. Accordingly, an agent may tell a customer "I'm sending you the image now" and, upon hearing a predefined beep on his phone, tell the customer "The image is now in you smartphone" or "We seem to have a problem sending you the image".

In another scenario, module 141 may use word spotting or other techniques to determine a context of a conversation with a customer, provide module 151 with a parameter indicative of the determined context and, based on the determined context, module 151 may select and send promotional or other content to the user device. Accordingly, embodiments of the invention may include automatically communicating information to a user over the session by a computing device, e.g., information may be communicated over a session by an attended or unmanned computing device.

Synchronizing data communication over a plurality of communication channels associated with a session may be achieved by user and agent session management modules. For example, user session management module 111 may monitor resources such as memory or processing capacity on user device 110 and coordinate, synchronize or other manage communication of information by agent devices 140 and 150. For example, realizing a high utilization of a central processing unit (CPU) of user device 110, module 111 may interact with module 151 to reduce or stop data communication such that a voice channel is provided enough CPU resources. Such action may be taken according to a configuration that prioritizes voice over data, e.g., enabling voice to be uninterrupted and slowing communication of data. Any other synchronization of communication of information over a plurality of communication channels in a session may be similarly made.

According to some embodiments, a user may use more than one device to interact over a session. For example, user device 110 may be a smartphone and user device 120 may be a home computer. In such cases, modules 121 and 111 may interact in order to synchronize or otherwise manage data and voice communication. For example, module 121 may inform module 111 upon successful reception of a content object on user device 120, and module 111 may provide the user with an indication (e.g., an audible indication as described herein) on user device 110.

Figure 5A:
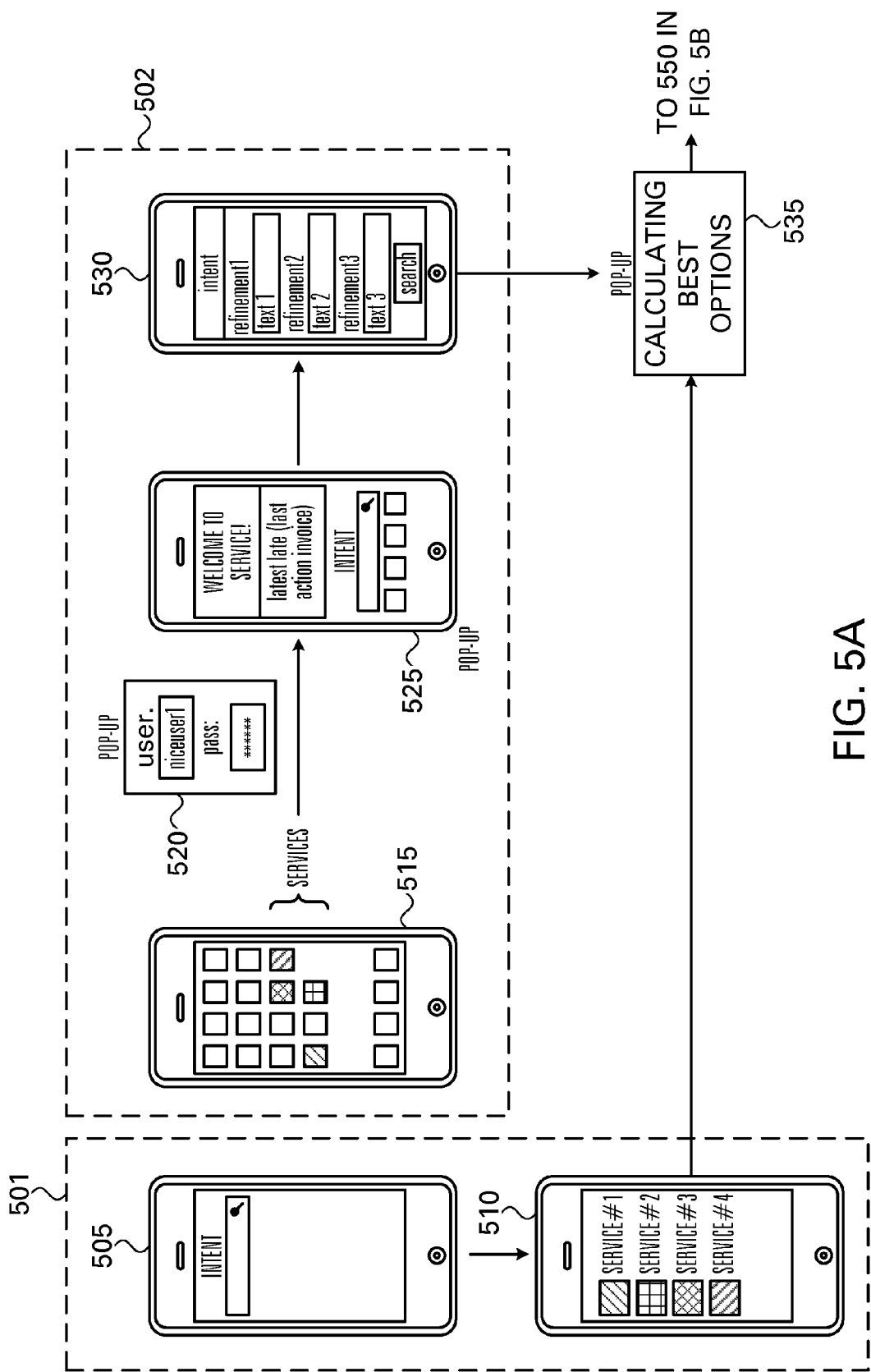
FIG. 5A, shows exemplary screenshots and operations according to embodiments of the present invention.

Reference is now made to FIG. 5A and FIG. 5B that show exemplary screenshots and operations according to embodiments of the present invention. Blocks 501 and 502 in FIG. 5A depict two exemplary configurations or options for interacting with a service provided. As shown by 505 and 510 in block 501, in a first configuration, a user may be prompted to provide an intent. For example, user session management module 111 on user device 110 may display a box for entering text as shown by 505. For example, the screenshot displayed by 505 may be set as the default screenshot of user device 110 and accordingly may be displayed when user device 110 is turned on or the screen may be displayed when activating an application, e.g., by pressing an icon or key.

A user may enter any text in a box as shown in screenshot 505 and the entered text may be used for searching a service. For example, user session management module 111 may use text provided by a user to search for a service based on locally stored information. For example, information or parameters related to recent, last or previous services requested by the user using user device 110 may be stored on user device 110 and an intent of a user or requested service entered in a text box as shown by 505 may be used to search such or other locally stored information or data.

Additionally or alternatively, user session management module 111 may send text provided by the user to a server, e.g., in contact center 160, a server connected to the internet or any other server, have such servers search for a service based on user provided text and return a result, e.g., in the form of a list of possible or matching services. For example, user session management module 111 may provide text entered in a screen such as shown by screenshot 505 to a CRM system in contact center, based on a user profile, history or any other information, the CRM system may compile a list of applicable, possible or matching services and communicate such list to user session management module 111. As shown by 510, a list of services may be presented to a user. For example, a list or set of services generated as described herein may be displayed.

Upon receiving a selection of a service (e.g., as a result of the user clicking on one of the services displayed as shown by 510) and/or determining an intent of a user, a best option for providing the selected service may be calculated as shown by 535. For example, an optimal option for providing the service or for interacting with a customer may be calculated as described herein. Accordingly, a service and/or optimal option for providing a service and/or interacting with a user may be determined automatically, e.g., based on text provided by a user or an intent of a user may be determined automatically, e.g., based on text provided by a user.

As shown by 502, another alternative or flow may be enabled. For example, as shown by 515, a set of services may be displayed on a display of a user device. For example, based on a user profile, locally or remotely stored information or any applicable configuration parameter, a set of icons related to a respective set of services may be displayed, e.g., on a default, home or other page or screen. As shown by 520, possibly upon receiving a selection of a service (e.g., as a result of the user clicking on one of the service icons shown by screenshot 515) a popup may be presented to a user enabling or prompting the user to provide a user name or other identification parameter and a password. For example, module 111 on user device 110 may cause a popup such as 520 to be displayed. Module 111 may capture information entered in popup 520, communicate the information to any applicable system (e.g., an ISP or a server in a contact center), and receive a result. For example, module 111 may send a user name and password provided by the user via popup 520 to a server in contact center 160. The server may authenticate the user based on the user name and password and return a result the may indicate successful authentication of the user or a failure to authenticate the user.

As shown by screenshot 525, possibly upon successful authentication, a screen such as screenshot 525 may be displayed prompting the user to provide an intent or requested service as described herein, e.g., with respect to screenshot 505. As further shown by screenshot 525, personal or other information may be displayed. For example, information related to past activities of the user, e.g., services used, may be displayed. Generally, upon identifying the user, e.g., based on the user name and password, any information, that may be stored locally (e.g., on user device 110) or remotely (e.g., in a CRM or other system in a contact center) may be displayed at any point. Likewise, promotional information such as advertisements may be displayed or provided (e.g., as multimedia content) based on a user profile and/or an identification of the user.

As shown by screenshot 530, possibly upon receiving and processing an intent of a user, the user may be enabled or prompted to refine his or her definition of an intent or of a required or desired service. A screen such as the one depicted by screenshot 505 may be provided prior to any processing of input provided in screen 525 or after processing of such input. For example, if, based on an intent provided using a screen such as shown by screenshot 525 a large number of possible or matching services is found, the user may be prompted to refine the definition his or her intent such that a smaller list of candidate services may be compiled. In other cases, a user may be prompted to provide text or other input prior to searching or determining possible or candidate services. For example, using a screen such as the one shown by screenshot 530 user may indicate services he or she is not interested in. For example, a user may indicate managing an account using a first screen (e.g., as shown by screenshot 525) and further indicate he is not interested in getting a loan using a screen as shown by screenshot 530. Accordingly, services related to managing an account and unrelated to getting a loan may be offered to the user. As shown by the arrow connecting blocks 530 and 535, provided with information obtained as described herein, a best option for providing a service or interacting with the user may be calculated.

Figure 6A:
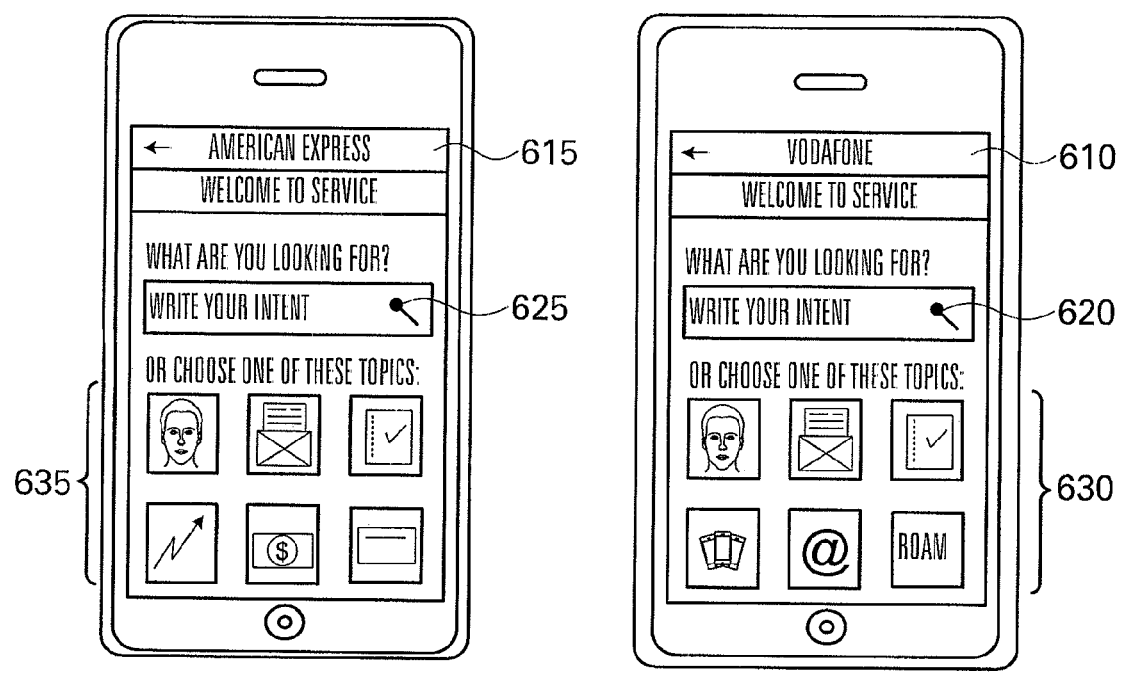
FIG. 6A, shows exemplary screenshots according to embodiments of the present invention.
Figure 6B:
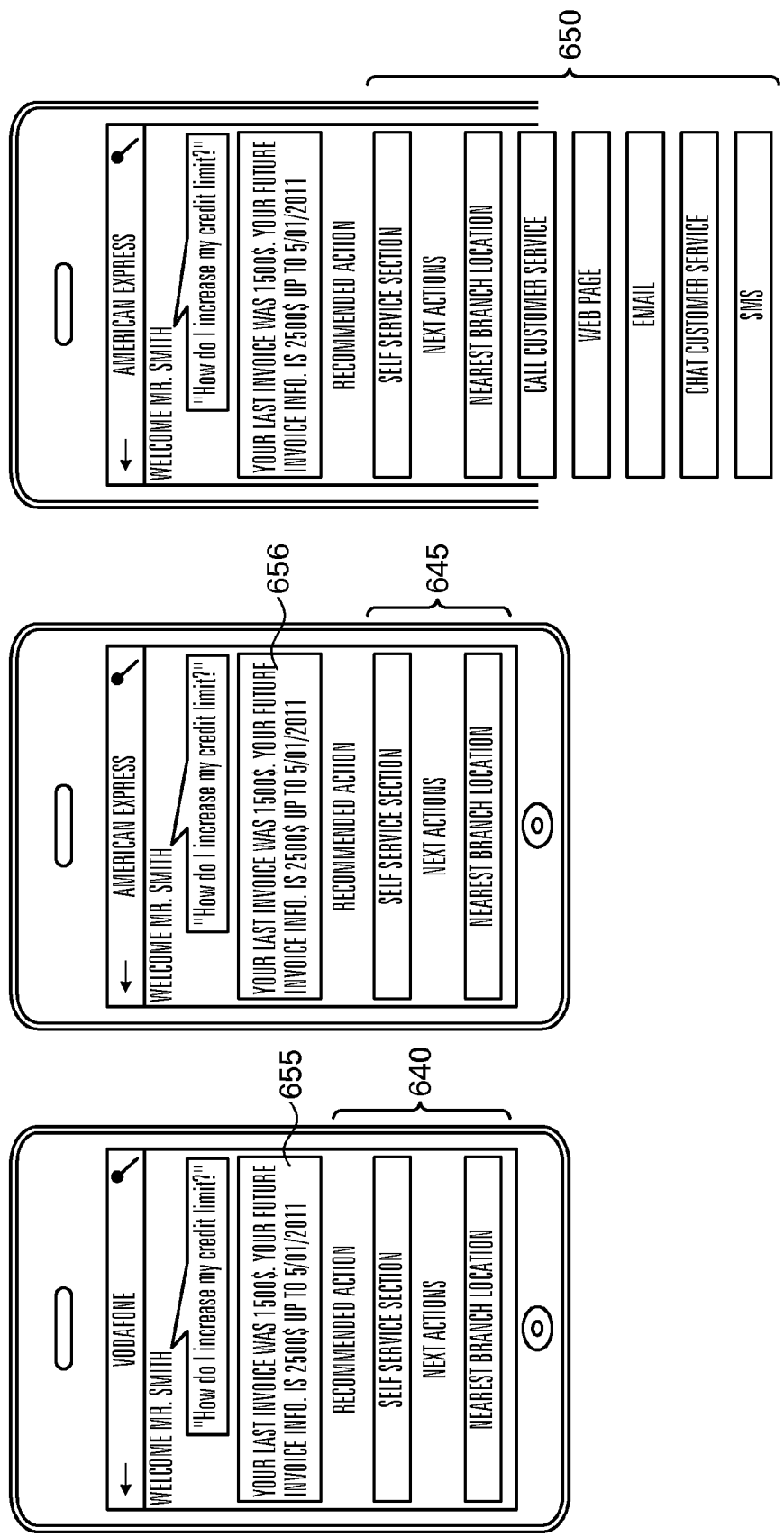
FIG. 6B, shows exemplary screenshots according to embodiments of the present invention.

In yet other embodiments, a session may be established based on, or in the context of, a specific service provider. Reference is additionally made to FIGS. 6A and 6B that show exemplary screenshots according to embodiments of the invention. As shown by 610 and 615 in FIG. 6A, a specific service provider, e.g., AMERICAN EXPRESS® or Vodafone® as shown may be determined based on any parameters or information that may be received from a user, extracted from a user profile or obtained from any applicable source. For example, based on a user's profile, a service provider may be selected. In other cases or embodiments, a service provider may be selected based on an intent or required service as indicated by a user, based on a location of the user or according to any information available to the system as described herein. Any information presented may be according to a selected service or service provider. For example, a set of options presented may be according to a specific service provider. For example, icons shown by 630 and 635 may be according to a service provider or a service. Accordingly and as shown, the set of options provided to a user as shown by 630 when a first service provider as shown by 610 is determined or selected may be different from the set of options shown by 635 when a second service provider as shown by 615 is determined or selected. As shown by 655 and 656, information related to a service or a determined or selected service provider or promotional information related to a service provider may be displayed. Similarly, a recommended action as shown by 640 and 645 may be according to a service provider and/or according to an intent or a selected service, service type or any service related parameters. As shown by 650, a list (e.g., displayed using a pull down menu or by scrolling) of recommended or possible actions or channels for interacting may be presented and may be according to a service, a service provider or other parameters, e.g., a location of the user, a profile or the user, offerings by service providers and the like.

As shown by screenshot 550, a channel selection may be provided to a user. As shown, a number of channels may be suggested. For example and as shown self service, going to a nearest service point, web services and/or calling a contact center or other service providing entity may be suggested channels. As shown by screenshot 555, by selecting a self service channel, a screen related to a self service application may be displayed. For example, a self service screen may enable a user to provide, and be provided with, information. For example, if the service required may be provided by providing information (e.g., prices, locations, opening hours and the like) then a self service application may provide the service as shown. Accordingly, customers may be directed to using self service channels thus possibly providing better and faster service and at the same time saving resources such as time spent by agents in a contact center or organization.

As shown by screenshot 560, selecting an option of going to a nearest point of service, a map may be displayed. For example, a map displayed may indicate the location of the customer (that may be determined by interacting with a GPS application on the user device), the location of the service point and directions for reaching the service point from the location of the customer to the service point. In some embodiments, user session management module 111 may interact with a GPS application on user device 110 in order to obtain the location of the user, obtain a nearest service point from a server in a contact center (e.g., by providing the location of the customer and requesting to be provided with a service point nearest to the customer location) and display a map indicating locations and providing directions. In other embodiments, web services may be used. For example, provided with a user location and a nearest service locations, user session management module 111 may interact with a map web service, provide the locations of the user and service, be provided by the web service with a map and directions and display such information to the user as shown by screenshot 560.

As shown by screenshot 565, selecting a web page channel the user may be provided with a web page. For example, a web page may be selected based on a determined intent of a user and/or a desired service. Any web page may be displayed as shown by screenshot 565. For example, a displayed web page may be a home page of an organization or, based on a determined intent or service, a specific page relevant or applicable to the service or intent may be displayed. In some embodiments, e.g., if a number of relevant web pages are found or determined, a list of web pages may be displayed enabling a user to select a specific web page. In some embodiments, a web surfing application such as known in the art web browsers may be launched and pointed at a selected web page or uniform resource locator (URL) as a result of selecting a web page channel.

As shown by block 551, selecting to call may cause establishing a call, e.g., with a call or contact center. A call channel may be dynamically associated with any relevant entity. For example, based on an intent, service or user related information such as user profile, user record and the like an agent, a contact center, a service provider or any relevant entity may be associated with a call channel. Accordingly, calling as shown by block 551 may be calling a contact center in one case, calling an organization in a second case and calling a service point in a third case, scenario or embodiment.

As shown by screenshot 580, a call or session with a contact center may be established, e.g., as a result of selecting a call channel as described herein. Various icons, buttons or other graphical user interface (GUI) objects may be dynamically displayed during a session established between a user and an agent or application. GUI object may be displayed, removed, replaced, modified and/or associated with functionalities based on a context, circumstance and/or progress of a session. In addition, keys on a keypad of a device may be dynamically associated with functionalities based on a circumstance, context and/or progress of a session.

As shown, upon establishing a call or session, information related to the session may be displayed on a screen of a user device. For example, module 111 may obtain (e.g., from an application or server in a contact center) the name of the agent talking to the customer and display the name on the screen of user device 110. Any other relevant information or content that may be text, images or multimedia content may be displayed on the screen of user device 110 during a call or session. As shown, content sharing may be enabled during a session that may include both a voice and data communication channels. For example, as shown by screenshot 585, an image acquisition application (e.g., an application operating a built in camera) may be launched during a call enabling a user to provide an agent with a picture of an object seen by the customer. For example, a customer trying to explain to an agent what kind of product he is interested in may provide the agent with a picture of the product during a call. To accomplish such feature, module 111 may, while a call between a user and an agent is in progress, interact with an application on user device 110 to obtained a captured image, establish a data communication channel with a system or device in contact center 160 (e.g., establish a TCP connection with a server in contact center 160) and send the image to the server or to a computer operated by the agent where the image may be viewed by the agent.

Any type of data may be communicated or exchanged between a user and an agent during a session or call. For example and as shown, by pressing a button, a user may cause automatic communication of parameters related to his or her location to an agent or to an application associated with the call or session. For example, after obtaining parameters form a GPS application on user device 110, module 111 may send such parameters to an agent or to an application in contact center 160. Provided with location parameters, an application in contact center 160 may provide an agent in contact center with a map and an indication of the user's location. Similarly, information related to weather conditions, geographical parameters such as altitude, the state or country from which the user is calling and the like may all be automatically or based on an action or a user be communicated to the agent, contact center or any party to a call or session. As shown by block 553, pressing a send location button may cause sending of a location, e.g., to an agent as described herein.

As shown by screenshot 554 and described herein, buttons on a display may be altered, replaced or otherwise manipulated based on any relevant parameters, e.g., an action performed by a user or data sent or received over a session. For example, location parameters sent as described herein may be used to determine a location of the user by a remote server and a map where the location of the user is indicated may be generated and sent to the user device. accordingly, after sending location parameters, buttons on a user device may be manipulated such that a "show location" button is present enabling the user to see his location on a map that may be generated as described herein. In some embodiments, a web application may be used, e.g., in order to show a location as described herein.

Figure 7:
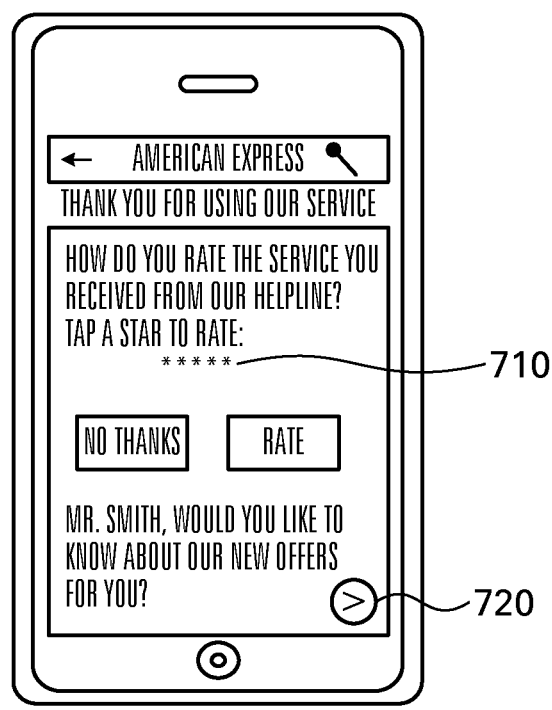
FIG. 7, shows an exemplary screenshot according to embodiments of the present invention.

As shown by screenshot 575, a feedback screen may be shown. For example, upon terminating a call or session (e.g., by pressing a hang up button as shown), a user may be provided with a feedback screen. It will be noted that while during a first period a session may include both a number of voice and a data channels enabling a user and agent to both talk and exchange data, during other periods or phases, a session may only include voice or data communication channels. For example, during a first phase when a user talks to an agent, session may only include a voice communication channel, then, during a second period, in order to communicate or exchange data such as text, images or multimedia content, a data communication channel may be added to, or associated with the session and, at yet another period, the voice communication channel may be removed from, or disassociated with the session and the session may then only include one or more data channels. For example, upon pressing the hang up button shown by screenshot 580, a voice communication channel associated with the session may be terminated, however, a data communication channel may be left active or established enabling communicating feedback from the user to a contact center where the feedback may be processed and/or stored. Reference is additionally made to FIG. 7 showing an exemplary screenshot according to embodiments of the invention. As shown by 710, a feedback screen may enable a user to press or tap a star in a row of stars to rank or grade a service provided. As shown by 720, promotional or other information may be suggested or provided to the user. Promotional information provided to a user in any of the screens shown and described herein may be received from a specific service provider. For example, upon selecting a service provider, a data communication channel may be established (possibly while or during other communication channels are established or active) between the user device and a server of the service provider or between the contact center and the server of the service provider, thus enabling a service provider to provide promotional or other information to a user, e.g., while the user is talking to an agent in the contact center. Accordingly, by enabling a number of concurrent communication channels between a user device and a number of computing devices as described herein, embodiments of the invention may enable exchanging or communicating voice, text, data and/or multimedia information between a user device and one or more computing devices over a single session.

Figure 4:
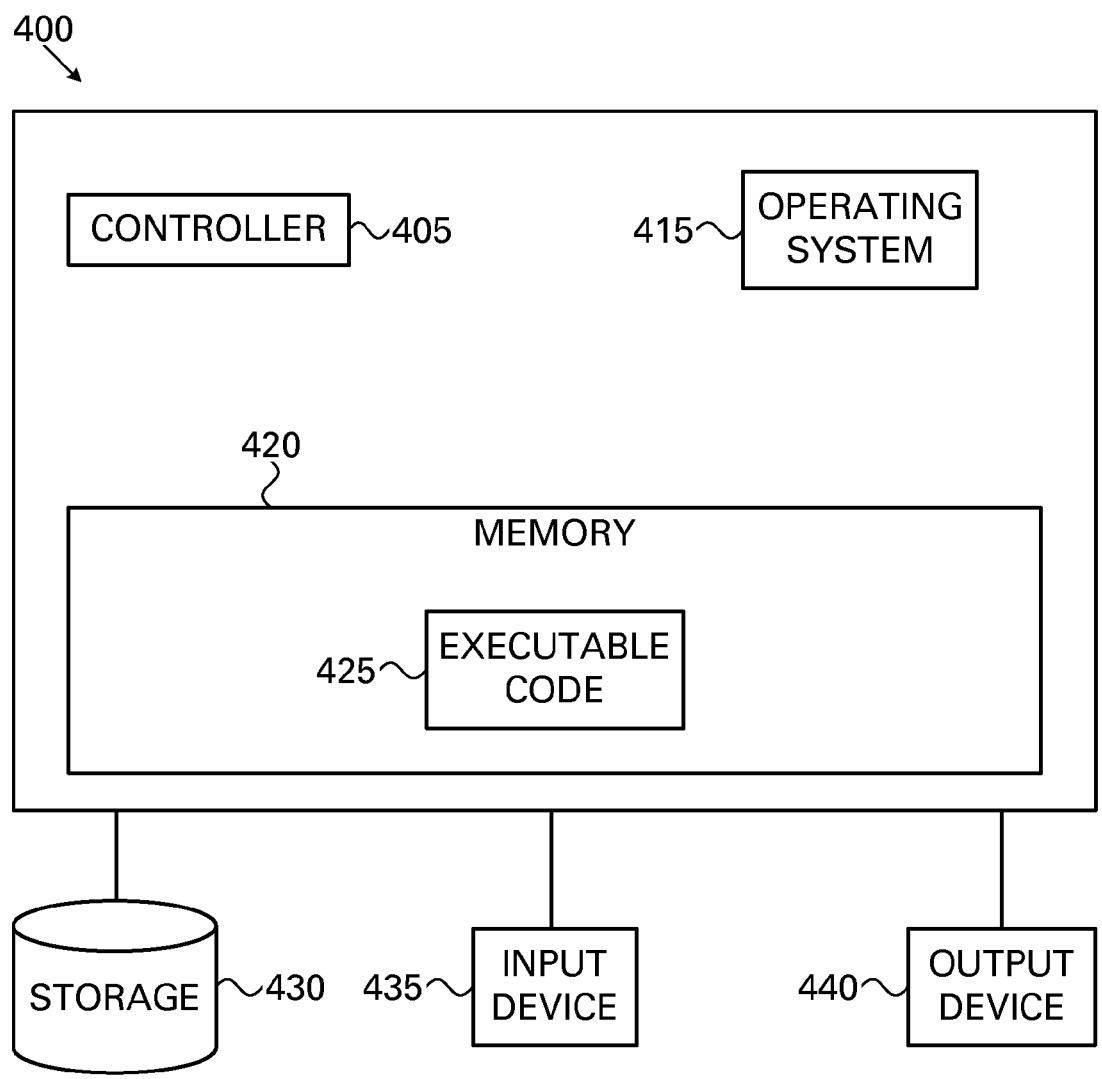
FIG. 4, shows high level block diagram of an exemplary computing device according to embodiments of the present invention.

Reference is made to FIG. 4, that shows a high level block diagram of an exemplary computing device 400 according to embodiments of the present invention. For example, user devices 110 and 120 and agent devices 140 and 150 may be or may include some or all components of computing device 400. As shown, computing device 400 may include a controller 405 that may be, for example, a central processing unit processor (CPU), a chip or any suitable computing or computational device, an operating system 415, a memory 420, a storage 430, an input device 435 and an output device 440.

Operating system 415 may be or may include any code segment designed and/or configured to perform tasks involving coordination, scheduling, arbitration, supervising, controlling or otherwise managing operation of computing device 400, for example, scheduling execution of programs. Operating system 415 may be a commercial operating system or a proprietary operating system, e.g., specifically designed for smartphones or devices used by agents in a contact center. Memory 420 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 may be or may include a plurality of, possibly different memory units.

Executable code 425 may be any executable code, e.g., an application, a program, a process, task or script. For example, executable code 425 may be, may be part of or may implement agent session management modules 141 and 151 and user session management modules 111 and 121. Executable code 425 may be executed by controller 405 possibly under control of operating system 415. Storage 430 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Input devices 435 may be or may include a mouse, a keyboard, an earphone, a microphone, a touch screen or pad or any suitable input device. It will be recognized that any suitable number of input devices may be operatively connected to computing device 400 as shown by block 435. Output devices 440 may include one or more displays, speakers and/or any other suitable output devices. It will be recognized that any suitable number of output devices may be operatively connected to computing device 400 as shown by block 440. Any applicable input/output (I/O) devices may be connected to computing device 400 as shown by blocks 435 and 440. For example, a network interface card (NIC), a printer or facsimile machine, a universal serial bus (USB) device or external hard drive may be included in input devices 435 and/or output devices 440.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 420, computer-executable instructions such as executable code 425 and a controller such as controller 405.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multipurpose or specific processors or controllers, a plurality of input units, a plurality of output units, a plurality of memory units, and a plurality of storage units. A system may additionally include other suitable hardware components and/or software components. In some embodiments, a system may include or may be, for example, a smartphone, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of providing a service to a user of a mobile communication device, the method comprising:
 receiving, by the mobile communication device, a selection of an application, the application being related to a plurality of services;
 providing information related to the user to a server and authenticating the user by the server;
 displaying on the mobile communication device details related to the user and to the plurality of services;
 receiving, by the mobile communication device, a selection of a service from the plurality of services;
 providing the selection of the service to a server and selecting by the server an optimal option for providing the selected service and displaying the selected option on the mobile communication device, wherein the selection of the optimal option is made based on parameters related to the user, the selected service and a service provider of the selected service and wherein the selection of the optimal option comprises selecting one or more voice communication channels and one or more data communication channels; and establishing, according to the selected optimal option, a session between an agent and the user wherein the session includes the selected one or more voice communication channels and the selected one or more data communication channels and wherein mobile communication device user input data and voice are concurrently transmitted over the session, the input data comprising one or more of text, images and multimedia content.

2. The method of claim 1, comprising providing the user with a list of communication channels and wherein selecting the optimal option for providing the selected service is based, at least in part, on an indication of a preferred communication channel received from the user.

3. The method of claim 1, wherein selecting the optimal option for providing the selected service is according to information in a user profile associated with the user.

4. The method of claim 1, wherein selecting the optimal option for providing the selected service is according to a parameter related to at least one of: a communication device used by the party, a geographical location of the patty, a date and a time of day.

5. The method of claim 1, comprising dynamically associating a communication channel with the session after the session was established.

6. The method of claim 1, comprising prompting the user to provide a feedback prior to terminating the session.

7. The method of claim 6, wherein prompting the user is based on data stored in a memory of the mobile communication device.

8. The method of claim 1, comprising communicating information over a first communication channel associated with the session based on information related to a second communication channel associated with the session.

9. The method of claim 1, wherein selecting optimal option for providing the selected service is based, at least in part, on information in a customer relationship management (CRM).

10. The method of claim 1, wherein the one or more data communication channel includes at least one of: a chat channel, an electronic mail (email) channel, an instant messaging channel and a short message service (SMS) channel.

11. The method of claim 1, comprising providing the user with marketing information over the session.

12. The method of claim 1, comprising communicating over the session a parameter related to a location of the user.

13. The method of claim 1, comprising communicating over the session multimedia information.

14. The method of claim 1, comprising communicating information to the user over the session by a computing device.

15. A system comprising:
a mobile communication device;
a computing device;
wherein the mobile communication device is configured to:
  receive a selection of an application, the application being related to a plurality of services,
  providing information related to a user of the mobile communication device to the computing device,
  display details related to the user and to plurality of services,
  receive a selection of a service from the plurality of services, and
  provide information related to the selection of the service to the computing device;
and wherein the computing device is configured to:
  authenticate the user, and
  select an optimal option for providing the selected service to the user, wherein the selection of the optimal option is made based on parameters related to the user, the selected service and a service provider of the selected service and wherein the selection of the optimal option comprises selecting one or more voice communication channels and one or more data communication channels;
and wherein the mobile communication device and the computing device are configured to establish, according to the selected optimal option, a session between an agent and the user wherein the session includes the selected one or more voice communication channels and the selected one or more data communication channels and wherein mobile communication device user input data and voice are concurrently transmitted over the session, and wherein the input data comprises one or more of text, images and multimedia content.

16. The system of claim 15, wherein the mobile communication device is configured to provide the user with a list of communication channels and wherein selecting the optimal option for providing the selected service is based, at least in part, on an indication of a preferred communication channel received from the user.

17. The system of claim 15, wherein selecting the optimal option for providing the selected service is according to information in a user profile associated with the user.

18. The system of claim 15, wherein selecting the optimal option for providing the selected service is according to a parameter related to at least one of: a communication device used by the user, a geographical location of the user, a date and a time of day.

19. The method of claim 1 wherein the input data additionally comprises data input via graphical user interface objects.

20. The method of claim 15 wherein the input data additionally comprises data input via graphical user interface objects.

* * * * *